United States Patent
Moosbrugger et al.

(10) Patent No.: US 11,137,244 B2
(45) Date of Patent: Oct. 5, 2021

(54) METHOD FOR POSITIONING MEASUREMENT POINTS ON A MOVING OBJECT

(71) Applicant: Henn GmbH & Co KG., Dornbirn (AT)

(72) Inventors: Christian Moosbrugger, Bezau (AT); Thomas Graziadei, Dornbirn (AT)

(73) Assignee: HENN GMBH & CO KG., Dornbirn (AT)

( * ) Notice: Subject to any disclaimer, the term of this patent is extended or adjusted under 35 U.S.C. 154(b) by 0 days.

(21) Appl. No.: 16/766,263

(22) PCT Filed: Nov. 29, 2018

(86) PCT No.: PCT/AT2018/060280
§ 371 (c)(1),
(2) Date: May 21, 2020

(87) PCT Pub. No.: WO2019/104363
PCT Pub. Date: Jun. 6, 2019

(65) Prior Publication Data
US 2020/0370880 A1 Nov. 26, 2020

(30) Foreign Application Priority Data
Nov. 30, 2017 (AT) .............................. A50991/2017

(51) Int. Cl.
*G01B 11/14* (2006.01)
*G01B 11/00* (2006.01)
(Continued)

(52) U.S. Cl.
CPC ....... *G01B 11/14* (2013.01); *F02M 35/10144* (2013.01); *F16L 55/11* (2013.01);
(Continued)

(58) Field of Classification Search
CPC ...... G01M 15/04; G01M 15/06; G01M 15/08; G01M 15/14; G01M 13/003;
(Continued)

(56) References Cited

U.S. PATENT DOCUMENTS 7,306,339 B2 * 12/2007 Kaufman ........... G01B 11/2518
353/28
7,414,735 B2 * 8/2008 Shimada .............. G01B 11/026
356/614
(Continued)

FOREIGN PATENT DOCUMENTS

AT 516707 A4 8/2016
CN 102187231 A 9/2011
(Continued)

*Primary Examiner* — Gordon J Stock, Jr.
(74) *Attorney, Agent, or Firm* — Stoel Rives LLP

(57) ABSTRACT

The invention relates to a method for positioning measurement points (15, 18) with respect to a feature (8) locationally fixed on an object (5), wherein the object (5) is moved along an adjustment track. A first and a second optical detection region (10, 11) are formed, by means of which the current actual position of the feature (8) is detected. The two detection regions (10, 11) are arranged overlapping each other thus forming an overlapping section (13). The measurement points (15, 18) are each arranged at a predefined fixed distance (16, 19) from the feature (8). If the feature (8) is within the first detection region (10), the measurement occurs at the first positioned measurement point (15). If the feature (8) is within the overlapping section (13), the first measurement point (15) is deactivated and the second measurement point (18) is activated and the measurement is performed.

6 Claims, 5 Drawing Sheets

Figure 1:
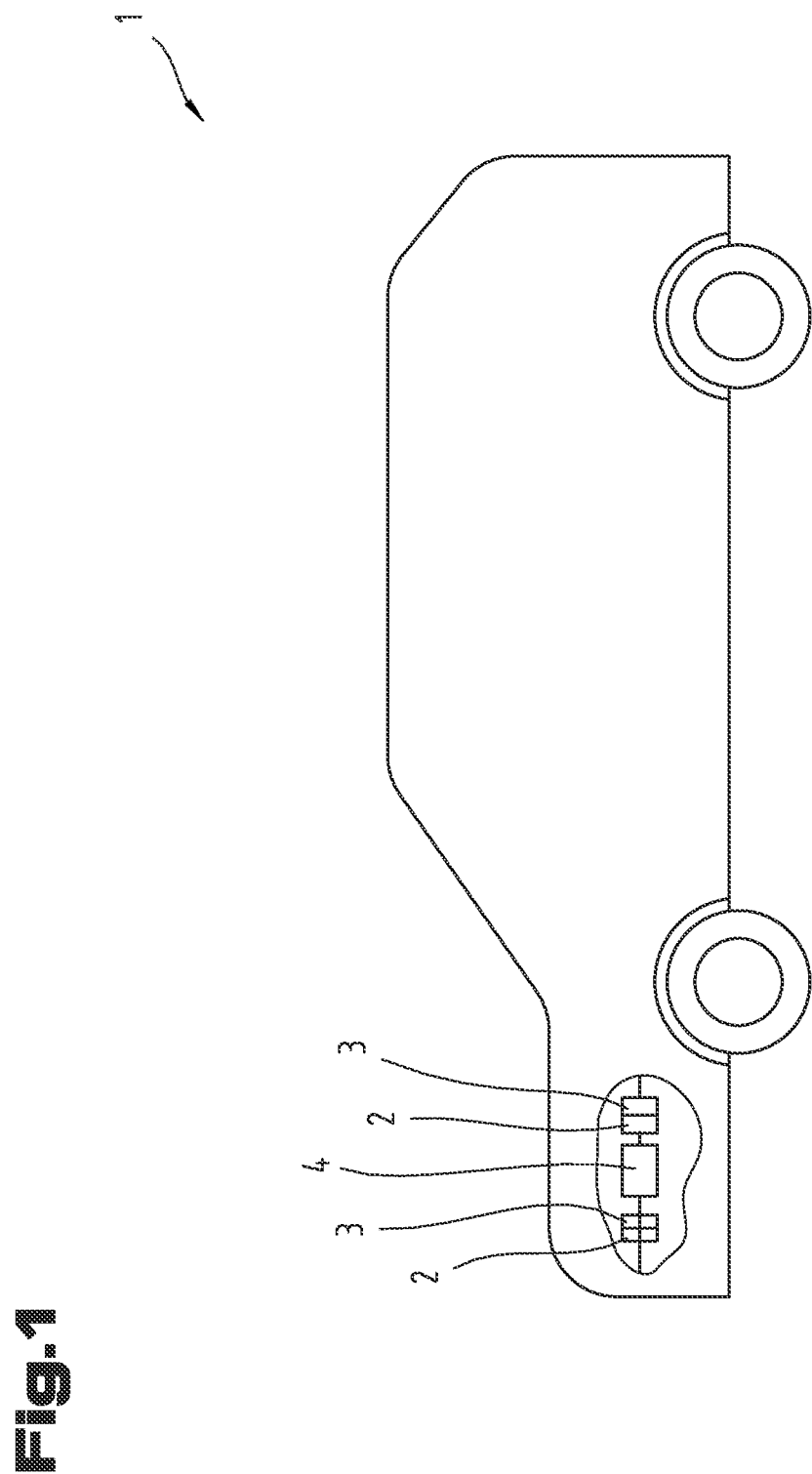

(51) Int. Cl.
*G01M 15/04* (2006.01)
*F02M 35/10* (2006.01)
*F16L 55/11* (2006.01)
*G01N 21/88* (2006.01)
*G01B 11/24* (2006.01)
*G01B 11/30* (2006.01)

(52) U.S. Cl.
CPC ............ *G01B 11/002* (2013.01); *G01B 11/24* (2013.01); *G01B 11/30* (2013.01); *G01M 15/04* (2013.01); *G01N 21/8803* (2013.01); *G01N 21/8806* (2013.01); *G01N 21/8851* (2013.01); *F02M 35/10157* (2013.01)

(58) Field of Classification Search
CPC .................. G01M 13/005; G01M 3/38; F02M 35/10144; F02M 35/10157; F02M 35/10242; F02M 35/10249; F02M 35/10373; F16L 13/141; G01B 11/002; G01B 11/005; G01B 11/02; G01B 11/022; G01B 11/024; G01B 11/026; G01B 11/028; G01B 11/03; G01B 11/14; G01B 11/16; G01B 11/167; G01B 11/22; G01B 11/24; G01B 11/2408; G01B 11/245; G01B 11/25; G01B 11/2518; G01B 11/30; G01B 11/303; G01B 11/306; G01N 21/8803; G01N 21/8806; G01N 21/8851; G01N 21/89; G01N 21/8901; G01N 21/95; G01N 21/9515; G01N 21/952

See application file for complete search history.

(56) References Cited

U.S. PATENT DOCUMENTS

| | | | |
|---|---|---|---|
| 7,808,644 B2 * | 10/2010 | Wagner | G01N 21/8806 356/446 |
| 8,050,486 B2 * | 11/2011 | Walton | G01N 21/88 382/141 |
| 8,282,893 B2 | 10/2012 | Schosnig et al. | |
| 8,964,189 B2 * | 2/2015 | Ohsawa | G06T 7/521 356/610 |
| 8,995,714 B2 * | 3/2015 | Ikeda | G01B 11/002 382/103 |
| 10,132,617 B2 | 11/2018 | Törngren | |
| 10,434,561 B2 * | 10/2019 | Rist | F16L 47/06 |
| 10,550,967 B2 * | 2/2020 | Hartmann | B21D 39/046 |
| 2004/0263840 A1 * | 12/2004 | Segall | G01B 11/02 356/243.1 |
| 2006/0228018 A1 * | 10/2006 | Abramovich | G01N 21/952 382/141 |
| 2011/0013015 A1 * | 1/2011 | Park | G01B 11/245 348/125 |
| 2016/0202045 A1 | 7/2016 | Schönleber et al. | |
| 2019/0293517 A1 * | 9/2019 | Chintadripet | B60K 15/0406 |
| 2020/0240567 A1 * | 7/2020 | Rist | B21D 39/046 |

FOREIGN PATENT DOCUMENTS

| | | | | |
|---|---|---|---|---|
| CN | 103339496 A | 10/2013 | | |
| CN | 105829828 A | 8/2016 | | |
| EP | 2364790 A1 | 9/2011 | | |
| EP | 3106242 A1 | 12/2016 | | |
| JP | 2011095196 A | 5/2011 | | |
| JP | 106170677 A | 2/2014 | | |
| JP | 201695289 A | 5/2016 | | |
| WO | WO-2015144470 A1 * | 10/2015 | ............ | H01R 43/20 |
| WO | 2017193145 A1 | 11/2017 | | |

* cited by examiner

METHOD FOR POSITIONING MEASUREMENT POINTS ON A MOVING OBJECT

RELATED APPLICATIONS

This application is a national stage under 35 U.S.C. § 371 of International Application No. PCT/AT2018/060280, filed Nov. 29, 2018, which claims priority of Austrian Patent Application No. A50991/2017, filed Nov. 30, 2017.

The invention relates to a method for positioning measuring devices and their measurement points or measuring windows with respect to a feature locationally fixed on an object.

AT 516 707 A4 by the same applicant describes a method for connecting a pipe with a plug connector, in which a pipe is clamped between a first casing section and a second casing section. In the course of this, the first casing section of the plug connector is deformed by means of a pressing tool. As a check, the press force applied to the pressing tool during the pressing operation is recorded and an increase in press force per unit of travel is calculated from the displacement path of the pressing tool and the press force. The calculated press force increase is compared with a minimum required press force increase per travel unit. If the minimum required press force increase per travel unit is not reached, the plug connector is recognized as faulty and can be rejected.

It was the object of the present invention to provide a method by means of which a user, on a moving item or a moving object with multiple interfering contours in the vicinity of a previously fixed feature, can securely detect it and carry out a secure and orderly measuring operation aligned in position at at least one measurement point or a measuring window arranged at a distance therefrom.

This object is achieved by means of a method according to the claims.

The method according to the invention serves for positioning at least one first measurement point or one first measuring window of a first measuring device with respect to a feature locationally fixed on an object. In this regard, the object along with its feature arranged or formed thereon is not stationary but moves along an adjustment track. In this method, at least the following steps are to be carried out:

forming at least one first optical detection region, the current actual position of the feature fixed on the object within the at least one first optical detection region being detected by means of said at least one first optical detection region,
  positioned arrangement of the at least one first measurement point or the at least one first measuring window at a predefined fixed first distance with respect to the currently determined actual position of the feature fixed on the object,
  carrying out at least one measuring operation on the object at the previously positioned at least one first measurement point or the previously positioned at least one first measuring window by means of the first measuring device, and in this process
  at least one second optical detection region is formed,
  the at least one second optical detection region is arranged behind the at least one first optical detection region in the direction of movement of the object,
  the at least one first optical detection region and the at least one second optical detection region are arranged so as to overlap one another and hence an overlapping section is formed between these,
  a second measuring device having at least one second measurement point or having at least one second measuring window is provided and the at least one second measurement point or the at least one second measuring window is arranged at a predefined fixed second distance with respect to the feature fixed on the object,
  during detection of the actual position of the feature fixed on the object within the overlapping section between the at least one first optical detection region and the at least one second optical detection region, the first measuring device with its at least one first measurement point or its at least one first measuring window is deactivated and further
  carrying out at least one further measuring operation on the object at the previously positioned at least one second measurement point or the previously positioned at least one second measuring window by means of the second measuring device.

The advantage of this is approach is that hence, in an even smaller optical detection region, namely the overlapping section, measurements with a high precision may be carried out by switching from a measuring device with its measurement point to a further measuring device with a further, other measurement point. By superimposing and overlapping the detection regions or detection sections to determine the current position of the selected and predefined feature on the object, possible interfering contours located adjacent to the feature can be hidden. Hence, it also becomes possible to select small or weakly pronounced features on the object as a reference point to be detected for positioning the measuring windows. Moreover, hence, the position of the respective feature can be tracked in real time. Furthermore, a plausibility check is also possible at any time due to the continuous detection of the feature.

Moreover, an approach is advantageous according to which the predefined fixed first distance as well as the predefined fixed second distance are selected to be equal to each other with respect to the feature fixed on the object at the beginning of the detecting operation. Thus, a quick switching operation between the first and the second measuring window can be carried out upon detection of the feature within the overlapping section.

A further advantageous approach is characterized in that the at least one first measurement point or the at least one first measuring window is continuously moved along at the predefined fixed first distance from the feature fixed on the object during the adjustment movement along the adjustment track. Due to the continuous moving along, hence, the respective measuring object is detected by the first measurement point or by the first measuring window and continuous measuring operations can be carried out.

An embodiment variant, in which the at least one second measurement point or the at least one second measuring window is continuously moved along at the predefined fixed second distance from the feature fixed on the object during the adjustment movement along the adjustment track, is also advantageous. However, this also allows for a continuous measuring sequence to be carried out at the at least one second measurement point during the adjustment movement of the feature within the overlapping section and in the subsequent, second optical detection region.

Another approach is characterized by multiple first measurement points or multiple first measuring windows being formed by the first measuring device and the first measurement points or the first measuring windows being arranged so as to be spaced from one another. Thus, measuring operations can be carried out on the object at multiple preferably different positions by the multiple arrangement of first measurement points or first measuring windows.

Moreover, an approach is advantageous according to which multiple second measurement points or multiple second measuring windows are formed by the second measuring device and the second measurement points or the second measuring windows are arranged so as to be spaced from one another. Hence, also if the feature on the object is located in the second optical detection region, multiple measurements can preferably be carried out at multiple second measurement points or second measuring windows simultaneously. Preferably, the second measurement points are at the same location or the same locations as the first measurement points or the first measuring regions on the respective object.

A further advantageous approach is characterized in that multiple measuring operations are carried out by the first measuring device when the feature of the object is located within the first optical detection region and outside of the overlapping section. Hence, this allows for continuous observation and control of the object due to the multiple measuring operations.

A variant of the method, in which multiple measuring operations are carried out by the second measuring device when the feature of the object is located within the overlapping section or within the second optical detection region, is also advantageous. Thus, the object can also be tracked if the feature on the object is located in the second optical detection region.

Another approach is characterized in that the adjustment movement along the adjustment track is carried out in a straight line. By selecting the straightly designed adjustment track, hence, a simple coordinated movement of the measurement points or measuring windows can be carried out.

Moreover, an approach is advantageous in which the object is formed by a plug assembly comprising a pipe, in particular for liquid or gaseous media, as well as a plug connector to be connected or already connected to the pipe. Thus, in particular in the case of a plug assembly, it is possible to control and monitor the correct execution of the pressing operation and the correct arrangement of components in relation to one another.

For the purpose of better understanding of the invention, it will be elucidated in more detail by means of the figures below.

Figure 2:
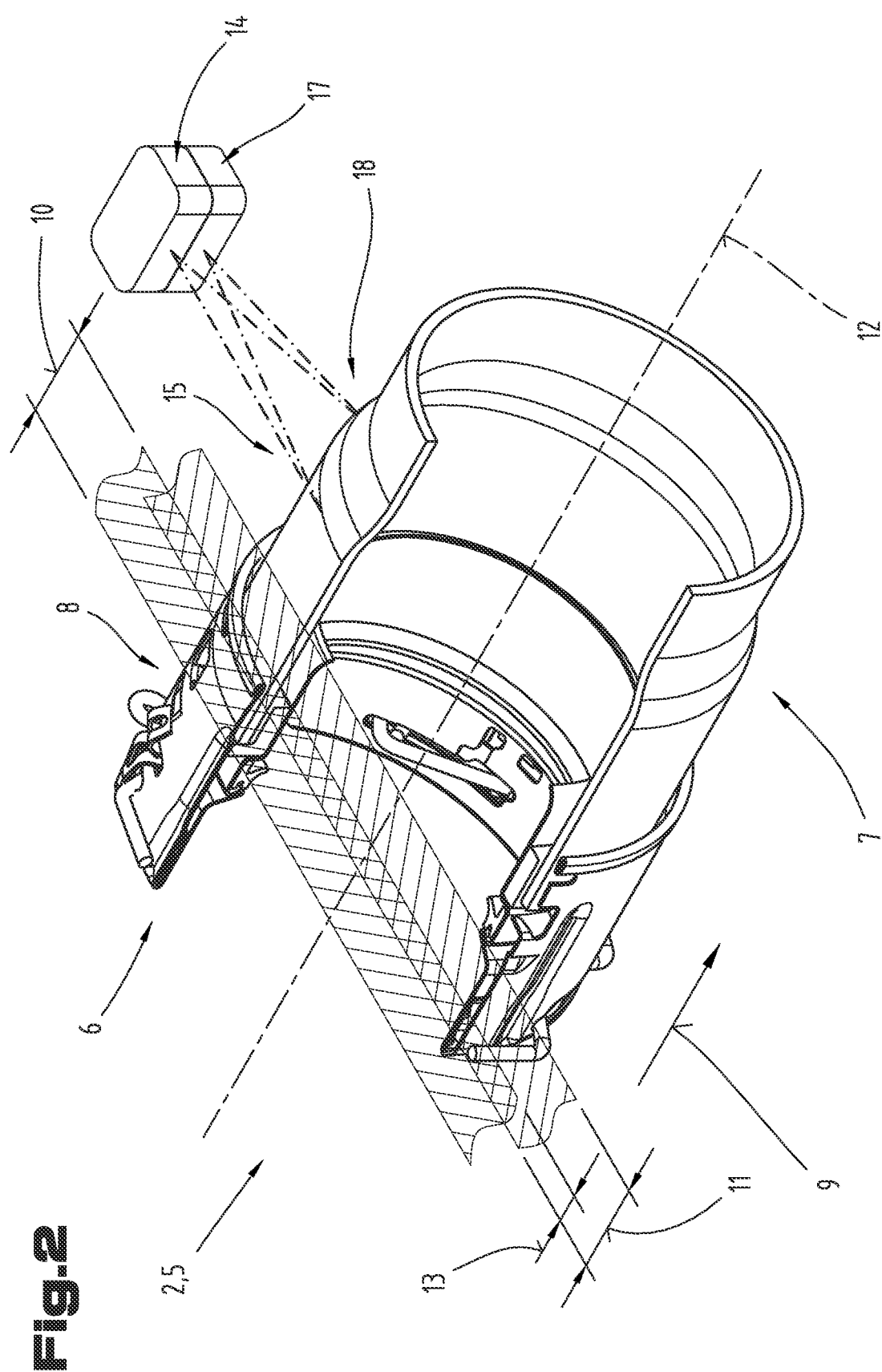
Figure 3:
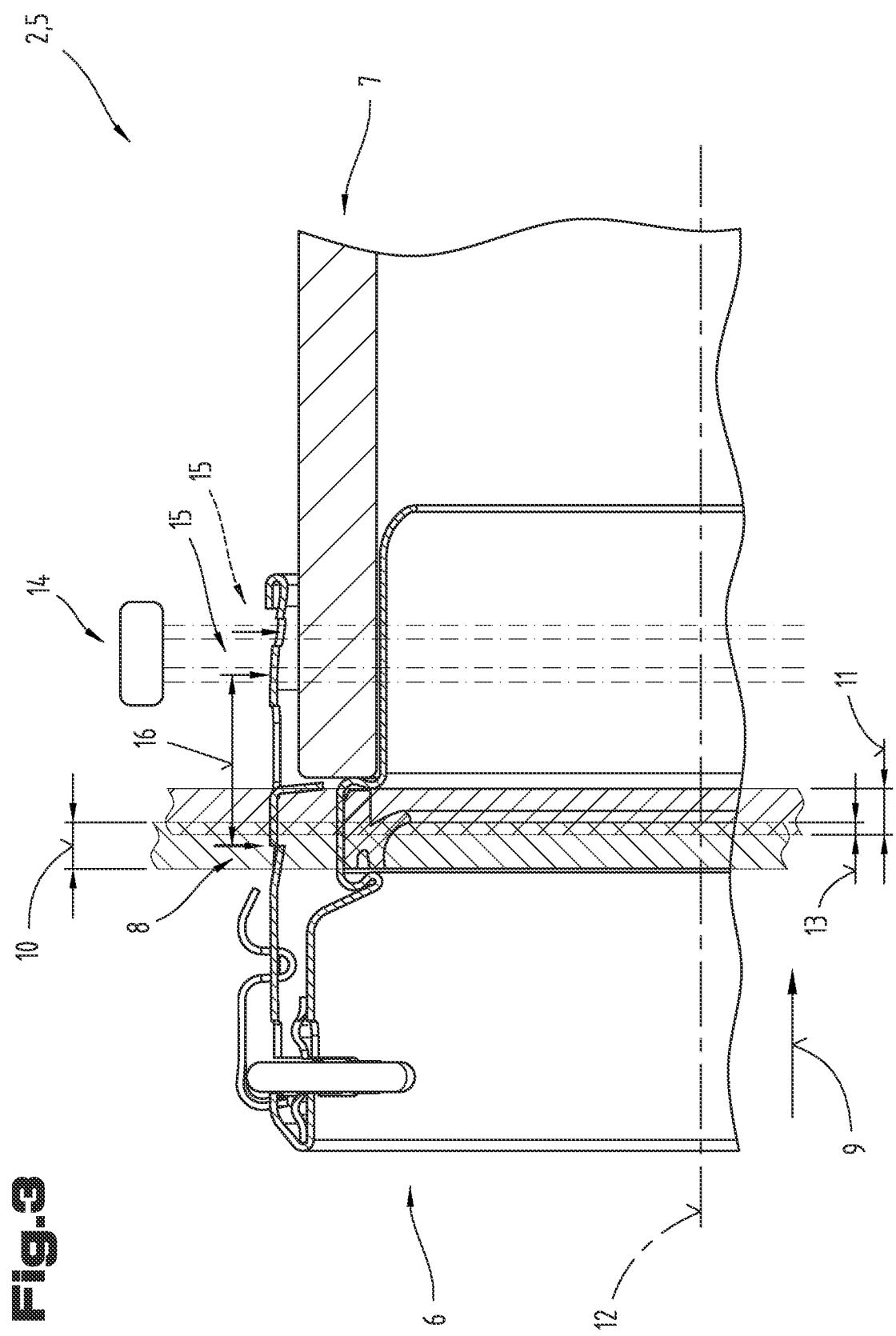
Figure 4:
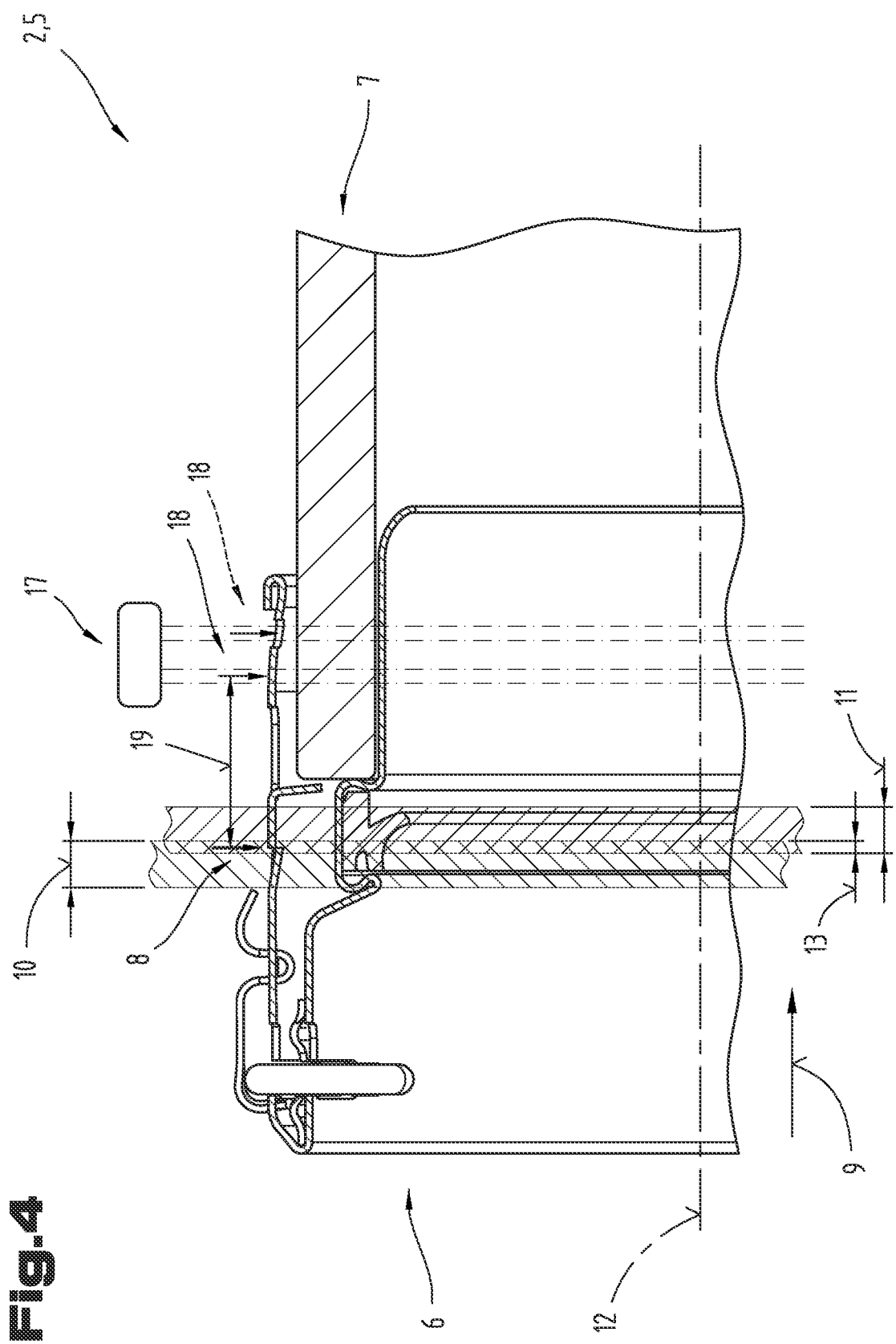
Figure 5:
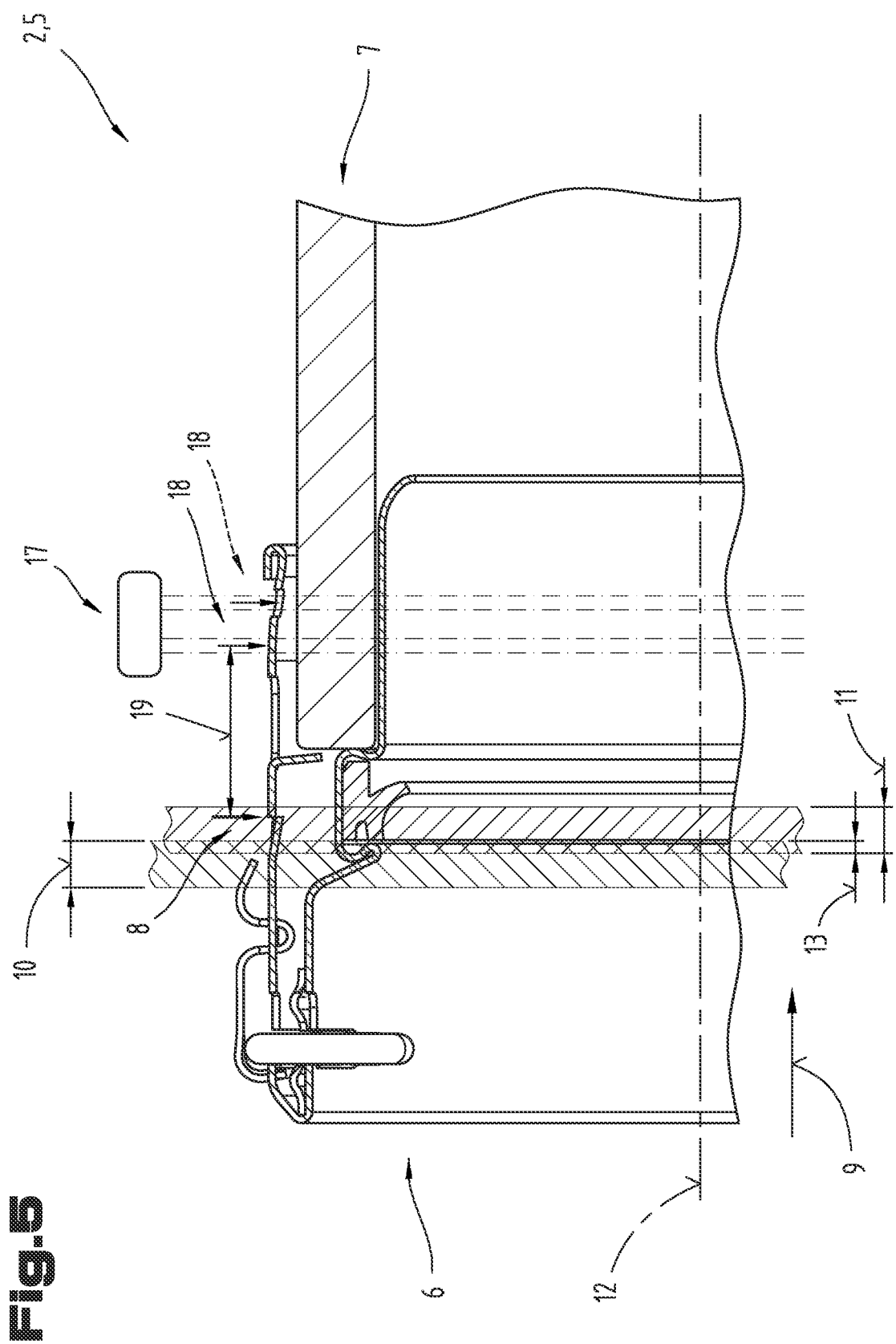

These show in a respectively very simplified schematic representation:

FIG. 1 a vehicle, partially in a sectional view with an object arranged therein and designed as a plug assembly;

FIG. 2 the object formed as a plug assembly in graphic representation and in quarter section;

FIG. 3 the object designed as a plug assembly according to FIGS. 1 and 2, in axial section and in a first position of the feature within the first detection region;

FIG. 4 the object according to FIG. 3, in axial section and in a second position of the feature with the overlapping section between the first and the second detection regions;

FIG. 5 the object according to FIGS. 3 and 4, in axial section and in a third position of the feature within the second detection region.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

The term "particularly/in particular" is hereinafter understood such that it may refer to a possible, more specific embodiment and more detailed specification of a subject matter or a method step, but does not necessarily have to represent an obligatory, preferred embodiment of the latter or an obligatory approach.

FIG. 1 shows a schematic representation of a vehicle 1 with a plug assembly 2 built into it. The vehicle 1 in particular is a road vehicle having a combustion engine. The plug assembly 2 can for example be used for connecting different components of the fresh air supply means to the combustion engine. It can for example be provided for that the plug assembly 2 is provided with a corresponding mating plug connector 3 for connecting two parts in the intake area of a turbocharger 4. It may further be provided for that a plug connection with such a plug assembly 2 is also used for connecting two components on the pressure side leaving the turbocharger 4.

In such plug assemblies 2, due to high quality requirements and operational safety, quality control is usually carried out piece by piece.

In FIG. 2, the plug assembly 2 is shown in quarter section and it is hereinafter generally referred to as object 5. The plug assembly 2 here comprises a plug connector 6 as well as a pipe to be connected thereto 7. The mutual connection is usually established by a plastic deformation process of a partial section of the plug connector 6, which can for example be produced from a metal material by means of a deep drawing process. This is preferably carried out from flat sheet metal.

In order to allow for performance of the diverse measuring operations prior to the deforming and connecting process of the object 5, in particular its plug connector 6, and/or during and/or subsequent thereto, positioned alignment of the measurement point or the measurement points relative to the object 5, in particular the plug connector 6 is to be carried out. This is described in further detail below and is to be carried out particularly if the object 5 has multiple so-called interfering contours in the vicinity of a predefined feature. The feature to the detected or to be recognized should be selected as prominent, it may not be easily identifiable, e.g. due to adjacent interfering contours, which may result in errors in optical recording and detection. Since the method described below can also be used for other objects 5, which do not form a plug assembly 2, the plug assembly 2 is merely referred to by way of example to describe a possible concrete application and the method is not necessarily limited to this component. The recognition and detection of at least one feature and the subsequent measuring operations associated therewith can also be referred to as position correction.

FIGS. 3 to 5 show a possible course of the method in which the individual method steps are shown and described on the object 5, here, on the plug assembly 2.

In this method, it is assumed that the object 5 has at least one feature 8, which can be detected by means of optical measuring technology and is recognized as such in an image-processing system. This technology is sufficiently known and is therefore not elucidated in further detail. The course of the method described below and the steps associated therewith are selected to ensure continuous tracking and stable recognition of the feature 8.

The object 5 is moved along an adjustment track with an adjustment direction 9 indicated by an arrow, wherein this movement can take place e.g. by a pressing operation of the plug connector 6 with the pipe 7 or otherwise. In this regard, the adjustment movement along the adjustment track can be straight. The adjustment direction 9 of the object 5 is preferably carried out in the indicated direction of the arrow.

For detecting and determining the previously defined or predetermined locationally fixed feature 8 on the object 5, here on the plug connector 6 of the plug assembly 2, at least one first optical detection region 10 and at least one second optical detection region 11 are formed. The two detection regions 10, 11 are each represented by a stripe with boundary lines on both sides. The detection regions 10, 11 may be arranged in a normal alignment with respect to a longitudinal axis 12 of the object 5 or be arranged to extend in the indicated adjustment direction 9. The representation of the respective measuring units by which the detection regions 10, 11 are formed or defined was omitted for the purpose of clarity.

The at least one second optical detection region 11 is arranged behind the at least one first optical detection region 10 in the direction of movement of the object 5 according to the indicated adjustment direction 9. In this case, the direction of movement is to be equated with the adjustment direction 9. The at least one first optical detection region 10 and the at least one second optical detection region 11 are arranged so as to overlap one another in some regions. Hence, an overlapping section 13 is formed between these. The overlapping section 13 is represented by crosshatching and is a part of both optical detection regions 10 and 11. The optical detection regions 10, 11 as well as the overlapping section 13 formed between these serve for detecting and determining the current actual location of the feature 8 fixed on the object 5.

In the present example, the adjustment direction 9 from left to right is selected. During the adjustment movement of the object 5, the feature 8 to be detected first reaches the first optical detection region 10. Hence, the actual position of the feature 8 can be unambiguously determined by means of the previously described measuring unit, e.g. in a coordinate system.

At least one first measurement point 15, which can also be referred to as measuring window, is formed or defined by a first measuring device 14. The arrangement and positioning of the at least one first measurement point 15 is carried out at a predetermined fixed first distance 16 from the currently determined actual position of the feature 8 fixed on the object 5. Thus, the at least one first measurement point 15 is arranged so as to be spaced from the currently detected feature 8 at the predetermined first distance 16. Hence, the correct measuring location on the object 5 can always be determined and found. Once the positioning of the first measurement point 15 has been carried out, at least one measuring operation can be carried out by means of the first measuring device 14. It can be seen from FIG. 3 that the feature 8 is still located within the first optical detection region 10.

FIG. 4 shows that the object 5 along with the selected feature 8 was moved further in the adjustment direction 9 along the adjustment track. Now, the feature 8 is located in or within the overlapping section 13 between the two optical detection regions 10 and 11.

For the further performance of measurements on the object 5, at least one second measuring device 17, by which at least one second measurement point 18 is formed or defined, is provided. The second measurement point 18 may also be referred to as second measuring window. Here, again, it is provided for that the at least one second measurement point 18 is arranged at a predefined fixed second distance 19 with respect to the feature 8 fixed on the object 5. To allow for the performance of an exact measurement at the at least one second measurement point 18, the first measuring device 14 and thus also the at least one first measurement point 15 are deactivated. The performance of at least one further measuring operation is carried out by means of the second measuring device 17 at its at least one second measurement point 18.

The measurement points 15, 18 each represent a measuring location precisely aligned in position on the object 5. Hence, for example the presence of a component or the distance between two components or the like can be determined at the measurement point(s) 15, 18. For this purpose, diverse measuring method and/or measuring means can be used. Preferably, noncontact measuring means such as 2D laser scanners, 3D laser scanners, vision sensors or camera systems are used. Vision sensors can for example check the alignment of components, features or the condition of components by comparison of images.

FIG. 5 then shows that the feature 8 is located solely within the second optical detection region 11 and the measurement at the at least one second measurement point 18 precisely aligned in position is now carried out by the second measuring device 17.

If the feature 8 is not located in any of the optical detection regions 10, 11, both measuring devices 14, 17 can be deactivated. As a consequence, no measuring operations can be carried out since the relation to the feature 8 is lacking.

The measuring units which form or defined the optical detection regions 10, 11 are in communication with the measuring devices 14, 17, optionally with the interposition of a controller.

It can moreover be provided for that the predefined fixed first distance 16 as well as the predefined fixed second distance 19 are selected to be equal to each other with respect to the feature 8 fixed on the object 5 at the beginning of the detecting operation. Hence, both measuring devices 14, 17 can always be moved along equally, with their activation and/or deactivation taking place depending on the current actual position of the feature 8.

The at least one first measurement point 15 or the at least one first measuring window should preferably be moved along the adjustment track so as to be constantly at the predetermined fixed first distance 16 from the feature 8 fixed on the object 5 during the adjustment movement. Hence, measurements can be carried out at any time depending on the respective activation state. However, the same can apply to the at least one second measurement point 18 or the at least one second measuring window.

To allow for measurements to be performed at multiple locations or positions on the object 5, multiple first measurement points 15 or multiple first measuring windows can be formed or defined by the first measuring device 14. Preferably, the first measurement points 15 or the first measuring windows are arranged to be spaced from one another. This is adumbrated in FIG. 3.

However, it is also possible that multiple second measurement points 18 or multiple second measuring windows, which can preferably be arranged to be spaced from one another, are formed or defined by the second measuring device 17. This is adumbrated in FIGS. 4 and 5.

During movement of the object 5 along the usually predetermined adjustment track, multiple measuring operations can be carried out by the first measuring device 14 when the feature 8 of the object 5 is still located within the first optical detection region 10 but still outside of the overlapping section 13.

If the feature 8 is already located within the first overlapping section 13 or within the second optical detection region 11, multiple measuring operation can also be carried out by the second measuring device 17.

The measurement results obtained in the measuring operations can be transmitted or forwarded to an open loop controller and/or a closed loop controller. Depending on the object 5, the associated measurement result or the associated measurement results can be stored in a storage medium.

Moreover, it would also be possible to provide multiple detection regions and to interlink these with one another.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS 1 vehicle
2 plug assembly
3 mating plug connector
4 turbocharger
5 object
6 plug connector
7 tube
8 feature
9 adjustment direction
10 first detection region
11 second detection region
12 longitudinal axis
13 overlapping section
14 first measuring device
15 first measurement point
16 first distance
17 second measuring device
18 second measurement point
19 second distance

The invention claimed is:

1. A method for positioning at least one first measurement point with respect to a feature locationally fixed on an object, while the object along with the feature locationally fixed thereon is moved along an adjustment track, wherein the following steps are carried out:
    forming at least one first optical detection region, wherein a current actual position of the feature fixed on the object is detected within the at least one first optical detection region,
    positioning the at least one first measurement point at a predefined fixed first distance with respect to the current actual position of the feature fixed on the object,
    carrying out at least one measuring operation on the object at the positioned at least one first measurement point by a first optical measuring device, wherein:
    at least one second optical detection region is formed,
    the at least one second optical detection region is arranged behind the at least one first optical detection region in the direction of movement of the object,
    the at least one first optical detection region and the at least one second optical detection region are arranged so as to overlap one another and hence an overlapping section is formed therebetween,
    a second optical measuring device having at least one second measurement point is provided and the at least one second measurement point is arranged at a predefined fixed second distance with respect to the feature fixed on the object,
    during detection of the actual position of the feature fixed on the object within the overlapping section between the at least one first optical detection region and the at least one second optical detection region, the first optical measuring device with its at least one first measurement point is deactivated, and
    carrying out at least one further measuring operation on the object at the at least one second measurement point by the second optical measuring device.

2. The method according to claim 1, wherein the predefined fixed first distance as well as the predefined fixed second distance are selected to be equal to each other with respect to the feature fixed on the object.

3. The method according to claim 1, wherein multiple measuring operations are carried out by the first optical measuring device when the feature of the object is located within the first optical detection region and outside of the overlapping section.

4. The method according to claim 1, wherein multiple measuring operations are carried out by the second optical measuring device when the feature of the object is located within the overlapping section or within the second optical detection region.

5. The method according to claim 1, wherein movement along the adjustment track is carried out in a straight line.

6. The method according to claim 1, wherein the object is formed by a plug assembly comprising a pipe for liquid or gaseous media and a plug connector to be connected to the pipe.

* * * * *